Patented Mar. 9, 1954

2,671,795

UNITED STATES PATENT OFFICE 2,671,795

ORGANOETHYNYL ORGANOSILANES

Kurt C. Frisch, Pittsfield, Mass., and Robert B. Young, Schenectady, N. Y., assignors to General Electric Company, a corporation of New York No Drawing. Application March 15, 1952, Serial No. 276,872

7 Claims. (Cl. 260—448.2)

This invention is concerned with novel silicon compositions. More particularly, the invention relates to compositions of matter corresponding to the general formula I   $R-C \equiv C-Si(R_1)_3$ where R and $R_1$ are monovalent hydrocarbon radicals.

Among the values which R and $R_1$ might be are, for instance, aliphatic, including lower alkyl radicals (e. g., methyl, ethyl, propyl, isopropyl, butyl, hexyl, dodecyl, etc.), unsaturated aliphatic radicals (e. g., vinyl, allyl, methallyl, etc.), as well as cycloaliphatic radicals (e. g., cyclopentyl, cyclopentenyl, cyclohexyl, etc.); aryl radicals (e. g., phenyl, diphenyl, naphthyl, etc.); alkaryl radicals (e. g., tolyl, xylyl, ethylphenyl, etc.); aralkyl radicals (e. g., benzyl, phenylethyl, phenylbutyl, etc.); and their homologues. It will, of course, be apparent to those skilled in the art that R and $R_1$ may represent the same or different monovalent hydrocarbon radicals of the class described above.

The above-mentioned acetylenic silicon compositions may be prepared in various ways. One method which has been found particularly effective is to effect reaction between a Grignard reagent corresponding to the general formula II   $R-C \equiv C-Mg-X$ and an organohalogenosilane of the formula III   $(R_1)_3Si-X_1$ where R and $R_1$ have the meanings given above and X and $X_1$ are halogens, X preferably being bromine, and $X_1$ preferably being chlorine. Among the halogens which X and $X_1$ may represent are, for instance, chlorine, bromine, fluorine, etc. A particularly effective Grignard reagent is one having the formula $R-C \equiv C-MgBr$ where R has the meaning given above.

Generally, for each mol of organoethynyl magnesium halide having the formula $R-C \equiv C-Mg-X$ there is employed at least one mole of the triorganohalogenosilane, for example, from 2 to 4 or more mols of the latter material. The reaction between the ingredients goes quite readily at room temperature and is preferably conducted in the solvent in which the Grignard reagent is dissolved, for example, the diethyl ether solvent. After careful addition of the triorganohalogenosilane to the organoethynyl magnesium halide, which addition is generally accompanied by stirring of the mixture and maintenance thereof at its reflux temperature, the mixture is continued to be refluxed using heat if necessary for several hours for a time ranging from about 2 to 6 hours. The precipitate thus obtained is advantageously filtered from the salts formed, and washed several times with organic solvents, e. g., diethyl ether, and the filtrate and washings fractionally distilled to give the desired product.

The organoethynyl magnesium halide may be prepared, for instance, by reacting ethyl magnesium bromide with a compound corresponding to the general formula $R-C \equiv CH$ where R has the meaning given above for the necessary period of time. As is known to persons skilled in the art, the ethyl magnesium bromide may be prepared by reacting magnesium turnings and a large excess of ether with ethyl bromide.

In order that those skilled in the art may better understand how the present invention may be practiced, the following examples are given by way of illustration and not by way of limitation. All parts are by weight.

Example 1

Ethyl magnesium bromide was prepared by adding 96.8 grams of magnesium turnings to 400 cc. ether and thereafter adding 436 grams ethyl bromide and 1200 cc. diethyl ether. This mixture was stirred thoroughly until it was evident that complete reaction had taken place to form the ethyl magnesium bromide Grignard reagent. This preparation of the Grignard reagent is well known to persons skilled in the art and requires no further details. Thereafter, about 50 grams of 1-hexyne was added to the Grignard solution and the mixture stirred well until it was evident that the compound 1-hexynyl magnesium bromide corresponding to the formula $CH_3(CH_2)_3-C \equiv C-MgBr$ was formed. Thereafter 1.5 grams of cuprous chloride was added as catalyst to the ether solution of 1-hexynyl magnesium bromide. This solution was in turn gradually added with stirring to 66.5 grams trimethylchlorosilane dissolved in 75 cc. diethyl ether. The rate of addition was such that moderate refluxing was maintained throughout thereof. This addition proceeded with some heat evolution so that it was desirable to have a reflux condenser attached to the reaction vessel. The mixture was then refluxed at the reflux temperature of the mass for about two additional hours. A voluminous precipitate was formed. This precipitate was filtered and washed with several portions of diethyl ether. The solvent was removed from the filtrate and the residual liquid fractionally distilled to give a colorless liquid boiling at around 155° C. at atmospheric pressure. This liquid which represented a yield of about 46%, was identified as 1-hexynyltrimethylsilane having the formula $$CH_3(CH_2)_3—C{\equiv}C—Si(CH_3)_3$$

by the analysis conducted on the composition. These analyses showed that the refractive index $n_D^{25}=1.4318$; $d_4^{25}=0.768$; and $M_R\equiv51.25$ (calculated 51.82). Analysis of the compound for percent silicon showed it to contain 18.09% silicon as compared to the calculated value of 18.18%. Molecular weight determination on the isolated composition showed that it was about 162 as compared to the theoretical molecular weight of 154.

*Example 2*

This example is concerned with the preparation of the compound 1-pentynyltrimethylsilane. More particularly 1-pentynylmagnesium bromide was prepared similarly as the 1-hexynyl magnesium bromide described in Example 1 with the exception that 50 grams of 1-pentyne was used in place of the 50 grams of 1-hexyne. To a solution of 80 grams of trimethylchlorosilane in 80 cc. of diethyl ether was added the Grignard reagent solution containing the 1-pentynylmagnesium bromide. The addition was conducted under the same conditions described in Example 1 using a reflux condenser and thereafter the mixture was refluxed for an additional period of time of about two hours. The precipitate was filtered and washed similarly as was done above and the washings and filtrate distilled to remove solvent and the residual liquid fractionally distilled to give a colorless liquid which distilled at 133–134° C. at atmospheric pressure. The amount obtained was in a yield of about 52%. This material was identified as 1-pentynyltrimethylsilane having a formula $$CH_3(CH_2)_2—C{\equiv}C—Si(CH_3)_3$$

by the analysis conducted on a composition. These analyses showed that the refractive index $n_D^{25}=1.4272$; $d_4^{25}=0.765$; and $M_R=47.01$ (calculated 47.19). Analysis of the compound for percent silicon showed it to contain 19.57% silicon as compared to the theoretical value of 20.0%. Molecular weight determination showed the composition to have a molecular weight of about 146 as compared to the theoretical molecular weight of 140.

*Example 3*

The compound 1-pentynyltriphenylsilane having the formula $$CH_3(CH_2)_2—C{\equiv}C—Si(C_6H_5)_3$$

may be prepared in the same way as 1-pentynyltrimethylsilane with the exception that instead of using trimethylchlorosilane for reaction with the 1-pentynylmagnesium bromide, one employs triphenylchlorosilane.

*Example 4*

The compositions herein disclosed and claimed can be employed in making derivatives therefrom. More particularly, 10 grams 1-pentynyltrimethylsilane, 0.25 gram palladium black (American Platinum Works), and 200 cc. decahydronaphthalene (B. P. 194.6° C.) were placed in a pressure reaction vessel (Parr hydrogenation apparatus) equipped with an inlet nozzle by which to add hydrogen, the pressure reactor closed, hydrogen then allowed to run in to the reaction vessel and to permeate the reaction mixture for about 40 hours. At the end of this time, the hydrogenation was stopped, the reaction mass removed from the pressure vessel, the solution filtered and the filtrate distilled to give a colorless liquid boiling at about 133–135° C. This material which was identified as 1-pentenyltrimethylsilane had a $n_D^{28}=1.4200$; $d_4^{28}=0.734$; $M_R=48.9$ (calculated 48.33). Analysis for percent silicon of this composition showed it to contain 19.1 per cent as compared to the theoretical value of 19.7 percent silicon. An unsaturation test was run using the Benham-Klee method but omitting mercuric acetate. This test showed that there was 94.4 percent unsaturation. In view of the above analytical results, it appeared certain that the reduction with hydrogen had stopped at the olefinic stage.

It will be apparent to persons skilled in the art that other organoethynyl organosilanes may be prepared by varying the type of organoethynyl magnesium halides used and the type of triorganohalogenosilanes employed. Thus, according to my invention compounds such as, for example, phenylethynyl trimethylsilane (from phenylethynyl magnesium bromide and trimethylchlorosilane), propynyl triethylsilane (from propynl magnesium bromide and triethylchlorosilane), butynyl trimethylsilane (from butynyl magnesium bromide and trimethylchlorosilane), pentynyl trioctylsilane (from 1-pentynyl magnesium bromide and trioctyl chlorosilane), hexynyl dimethylphenylsilane (from 1-hexynyl magnesium bromide and dimethylphenylchlorosilane), etc., may be prepared without departing from the scope of the invention. Obviously, other combinations of ingredients may be employed in which R in the Grignard reagent having the formula $$R—C{\equiv}C—Mg—X$$

and R1 in the formula $$(R_1)_3Si—X_1$$

may represent different and various monovalent hydrocarbon radicals preferably free of olefinic unsaturation, many examples of which have been given previously. With specific reference to the use of the triorganohalogenosilanes, other such materials may be used, for example, tributylbromosilane, tritolychlorosilane, dimethylethylchlorosilane, vinyldimethylchlorosilane, dimethylbenzylchlorosilane, etc.

The acetylenic silicon derivatives herein disclosed and claimed are useful as starting materials for making various polymeric compositions. Thus these compositions may be polymerized with various vinyl polymerization type catalysts, e. g., benzoyl peroxide, to make polymers having utility as insulating or dielectric media. In addition, derivatives from these materials may be made by reaction of the acetylenic silicon compositions with various reacting materials capable of adding across acetylenic triple bond. Thus compositions as pointed out in Example 3 above may be hydrogenated to give olefinic or paraffinic derivatives, depending on the degree of hydrogenation. In addition hydrogen halides may also be added across the triple bond to completely saturate the latter bond or to add only one molecule of hydrogen halide. The introduction of hydrogen halide adds an additional functional group, namely, halogen atom, to the compound. Moreover, halogenation of the acetylenic silicon composition may be carried out by subjecting the above-described material to reaction with a halogen, for example, chlorine, fluorine, bromine, etc., whereby part or all of the unsatisfied valence bonds of the triple bond may be saturated with halogen.

Organic acids, alcohols, acid chlorides, ammonia, and amines may also be added across the triple bond to give new derivatives. Other silicon compositions, particularly silicon compositions containing a silicon-bonded hydrogen and a silicon-bonded halogen, for example, silicochloroform and methyldichlorosilane, may be added across the triple bond to give additional silicon substitution. Finally, such materials as $H_2S$, mercaptans, HCN, organic nitriles, etc., may also be added to make new derivatives thereof.

The above described acetylenic silicon compositions may also be copolymerized with various materials including styrene, butadiene, vinyl chloride, vinyl acetate, various acrylates and methacrylates, acrylonitrile, etc., to form new and useful polymeric materials. The ability to polymerize across triple bond or double bond in the case of addition compounds, is important for silicone polymers in order to obtain a faster cure for silicone rubbers or quicker drying times for silicone varnishes.

What we claim as new and desire to secure by Letters Patent of the United States is:

1. A composition corresponding to the general formula $$R-C\equiv C-Si(R_1)_3$$

where R is an alkyl radical and $R_1$ is a member selected from the class consisting of alkyl, phenyl, diphenyl, naphthyl, aralkyl, alkaryl, vinyl, allyl, methallyl, and cycloaliphatic radicals.

2. 1-hexynyltrimethylsilane.
3. 1-pentynyltrimethylsilane.
4. 1-pentynyltriphenylsilane.
5. The process of making compositions corresponding to the general formula $$R-C\equiv C-Si(R_1)_3$$

where R is an alkyl radical and $R_1$ is a member selected from the class consisting of alkyl, phenyl, diphenyl, naphthyl, aralkyl, alkaryl, vinyl, allyl, methallyl, and cycloaliphatic radicals, which process comprises reacting a Grignard reagent corresponding to the formula $$R-C\equiv C-Mg-X$$

with an organohalogenosilane having the formula $$(R_1)_3Si-X_1$$

where X and $X_1$ are halogens and R and $R_1$ are each monovalent hydrocarbon radicals.

6. The process which comprises reacting 1-pentynyl magnesium bromide with trimethylchlorosilane thereby to produce 1-pentynyltrimethylsilane.

7. The process which comprises reacting 1-hexynyl magnesium bromide with trimethylchlorosilane thereby to produce 1-hexynyltrimethylsilane.

KURT C. FRISCH.
ROBERT B. YOUNG.

References Cited in the file of this patent

UNITED STATES PATENTS

| Number | Name | Date |
|--------|------|------|
| 2,082,569 | Carothers | June 1, 1947 |
| 2,551,924 | Boldebuck | May 8, 1951 |

OTHER REFERENCES

Volnov et al., "Jour. Gen. Chem." (USSR), 1940, vol. 10, pp. 1600-4.

Rochow, "Chemistry of the Silicones" (1946), p. 14, Wiley and Son, publishers, New York.

Gilman et al., "Jour. Am. Chem. Soc.," vol. 73, December 1951, pp. 5878-9.